No. 876,794. PATENTED JAN. 14, 1908.
E. D. FRITCH & G. DREWRY.
TICKET.
APPLICATION FILED NOV. 12, 1907.
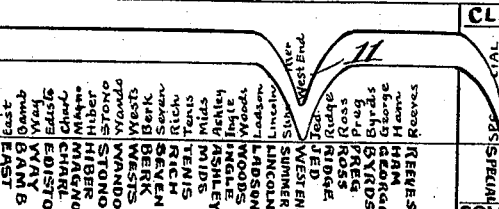

UNITED STATES PATENT OFFICE.

EDMUND D. FRITCH, OF CHICAGO, ILLINOIS, AND GEORGE DREWRY, OF WASHINGTON, DISTRICT OF COLUMBIA.

TICKET.

No. 876,794.  Specification of Letters Patent.  Patented Jan. 14, 1908.

Application filed November 12, 1907. Serial No. 401,863.

*To all whom it may concern:*

Be it known that we, EDMUND D. FRITCH and GEORGE DREWRY, both citizens of the United States, residing, respectively, at Chicago, in the county of Cook and State of Illinois, and at Washington, in the District of Columbia, have invented certain new and useful Improvements in Tickets, of which the following is a specification.

Our invention pertains to a ticket primarily adapted for use upon railroads and consists of the novel form and combination of elements more particularly set forth in the following detailed description and pointed out in the claims appended thereto.

The object of the invention is to prevent the fraudulent changing of the ticket either by the agent or by the passenger.

A further object is to provide a ticket from which the class of the passenger, as well as the destination station may be cut from the body of the ticket, the class and designation station being designated by the apex of the "V" shaped indentation, or notch, on the passenger's portion of the ticket, resulting from the severing of the agent's stub with the prong, or prongs thereon.

In the accompanying drawing, Figure 1 is a plan view of a ticket embodying our invention. Fig. 2 is a similar view with the tickets severed.

Referring now more particularly to the drawing, 3 represents, as a whole, a ticket adapted to be severed along the line 4 forming the body 5 of the ticket, which is retained by the passenger, and a receipt stub 6, that is held by the agent. The body portion 5 is provided with two parallel adjacent columns 7 and 8, designating stations similar in name and inversely arranged, as well as two parallel adjacent columns 9 and 10, also inversely arranged and designating the class of the passenger.

The ticket is adapted for use in connection with ticket cutters which are provided with a blade, having a severing point thereon and the severing point being adapted to cut from one of the adjacent columns upon the body of the ticket, the name of the station for which the ticket was purchased, and also to cut the class thereby forming an integral prong, or prongs 11 and 12, on the agent's stub, each of which bear only one name.

While the ticket is capable of being severed in many ways, it is intended that the portion showing the double row of stations only be used as a passenger ticket, the destination being designated by the name opposite the "V" shaped cut, and the remaining row used as a check row, thereby making it impossible to change the destination on the ticket, as by plugging the indentation or by cutting the ticket on any other line to obliterate the original indentations. As the agent's stub only shows one name, it would be, therefore, impossible to alter it.

It will be particularly noted that the major portion of the parting line between the two portions 5 and 6 of the ticket is perfectly straight and is preferably parallel with the longitudinal edges of the whole ticket and that said straight line is broken only by the relatively sharply convergent lines forming the long tab or tabs on the agent's stub and the deep indentation or indentations on the passenger's portion, and that the straight portion of the parting line lies wholly outside of the columns of station and class indices. This arrangement renders it impossible for the agent to change the relation of the tab or stub on his stub by cutting another line or lines farther back into the body of the stub to form another tongue or tongues, as has been found possible with other forms of tickets, because, by so doing, he would remove the tongue or tongues originally cut and which contain the only station, or station and class indices on said stub. Likewise the passenger can neither plug the indentation or indentations on his portion of the ticket, nor change the name of the station or the class designation because the column of station and class indices from which the tabs on the agent's stubs were cut will indicate to the ticket collector at a glance, the real station and class for which the ticket was issued. Obviously also if the agent tore off the tab or tabs on his stub he would not be benefited for the stub would have no station index and the absence of a class tab would indicate the issuance of a full first-class ticket. Furthermore, should the passenger attempt to alter his ticket by cutting away the outside column of station and class indices and indent the next column opposite a different station and class index, the mere absence of the outer check column would clearly show the fraudulent tampering.

Having now described our invention, we claim:

1. A railway ticket comprising a portion designated as a passenger's portion, and a portion designated as an agent's stub detached therefrom, said ticket having printed thereon side by side two duplicate rows of names indicating stations, the names of all of said stations excepting the destination station in one row appearing on the passenger's portion, and the name of said destination station missing on the passenger's portion alone appearing on the agent's stub; substantially as described.

2. A railway ticket comprising a portion designated as a passenger's portion having an indentation therein, and a portion designated as an agent's stub detached therefrom having a laterally projecting prong thereon, said ticket having printed thereon side by side two duplicate rows of names indicating stations and each name in one row being reversed with respect to the alining name in the other row, all of said names excepting the destination station of one row appearing on said passenger's portion, and said destination station of one row alone appearing on the laterally projecting prong of the agent's stub registering with the similarly shaped indentation in the adjacent margin of the passenger's portion; substantially as described.

3. A railway ticket comprising a portion designated as a passenger's portion and having indentations therein, and a portion designated as an agent's stub detached therefrom having laterally projecting prongs thereon, said ticket having printed thereon side by side two duplicate rows of designations indicating stations and classes of travel and each designation in one row being reversed with respect to the alining designation in the other row, all of said designations excepting the destination station and class of the ticket of one of said rows appearing on said passenger's portion and said destination station and class of the ticket of one row alone appearing on the laterally projecting prongs of the agent's stub registering with the similarly shaped indentations in the adjacent margin of the passenger's portion; substantially as described.

EDMUND D. FRITCH.
GEORGE DREWRY.

Witnesses to signature of Edmund D. Fritch:
JAMES R. OFFIELD,
ALLEN W. MOORE.

Witnesses to signature of George Drewry:
R. P. RIXEY,
CHAS. J. O'NEILL.